US008002932B2

(12) United States Patent
Ohira

(10) Patent No.: US 8,002,932 B2
(45) Date of Patent: Aug. 23, 2011

(54) METHOD FOR PREPARING GOLF BALL WITH INDICIA HAVING METALLIC LUSTER

(75) Inventor: Takashi Ohira, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 485 days.

(21) Appl. No.: 11/318,536

(22) Filed: Dec. 28, 2005

(65) Prior Publication Data

US 2007/0149319 A1 Jun. 28, 2007

(51) Int. Cl.

| | |
|---|---|
| ***B29C 65/48*** | (2006.01) |
| ***B29C 65/52*** | (2006.01) |
| ***B32B 37/12*** | (2006.01) |
| ***B32B 37/14*** | (2006.01) |
| ***B32B 37/26*** | (2006.01) |
| ***B44C 1/14*** | (2006.01) |
| ***B44C 1/165*** | (2006.01) |
| ***B44C 1/24*** | (2006.01) |
| *A63B 37/12* | (2006.01) |
| *A63B 37/14* | (2006.01) |
| *B44C 1/17* | (2006.01) |
| *B32B 37/06* | (2006.01) |
| *B32B 37/10* | (2006.01) |
| *B32B 37/16* | (2006.01) |

(52) U.S. Cl. ........ 156/241; 156/230; 156/233; 156/277; 156/289; 156/291; 473/351

(58) Field of Classification Search .................. 156/230, 156/233, 241, 237, 307.1, 307.7, 277, 289; 428/32.6, 32.74, 914; 473/351; 101/DIG. 40; D21/708

See application file for complete search history.

(56) References Cited

U.S. PATENT DOCUMENTS

| | | | | |
|---|---|---|---|---|
| 5,304,268 | A * | 4/1994 | Hoopengardner | 156/90 |
| 5,344,681 | A * | 9/1994 | Calhoun et al. | 428/42.3 |
| 5,878,670 | A * | 3/1999 | Yamaguchi | 101/492 |
| 6,217,985 | B1 * | 4/2001 | Hirukawa et al. | 428/195.1 |
| 6,540,624 | B1 * | 4/2003 | Isogawa | 473/371 |
| 6,748,867 | B2 * | 6/2004 | Kametani et al. | 101/491 |
| 6,855,073 | B1 * | 2/2005 | Keller et al. | 473/374 |
| 2001/0003716 | A1 * | 6/2001 | Kametani et al. | 473/351 |
| 2003/0102204 | A1 * | 6/2003 | Shimizu et al. | 200/341 |
| 2003/0193718 | A1 * | 10/2003 | Budd et al. | 359/536 |

FOREIGN PATENT DOCUMENTS

| | | | |
|---|---|---|---|
| JP | 8-47551 | A | 2/1996 |
| JP | 2000-001692 | A | 1/2000 |

* cited by examiner

*Primary Examiner* — Sonya Mazumdar
(74) *Attorney, Agent, or Firm* — Sughrue Mion, PLLC

(57) ABSTRACT

A method for preparing a golf ball with surface indicia such as a letter or image having metallic luster includes the steps of forming an adhesive indicia made of a thermoplastic resin on a golf ball surface, bonding the metal thin-film on a metal thin film-bearing film over the indicia under pressure or heat and pressure, then peeling off the film so as to leave a portion of the metal thin-film having the same shape as the indicia adhering to and laminated with the indicia.

15 Claims, 3 Drawing Sheets

METHOD FOR PREPARING GOLF BALL WITH INDICIA HAVING METALLIC LUSTER

BACKGROUND OF THE INVENTION

The present invention relates to a method for preparing golf balls with surface indicia having metallic luster. The invention also relates to golf balls obtained by such a method.

Golf balls are commonly marked by directly or indirectly printing indicia, including letters, numbers, trade names and images such as logos on the surface of the ball. Brightness is sometimes imparted to these marks to give the ball a more vivid and aesthetically pleasing appearance. A technique for imparting brightness that has been described involves preparing an ink that contains a metal powder such as aluminum or copper powder, and using the ink to apply metallic marks to a golf ball.

Marking methods for obtaining attractive images having a metallic luster include printing methods that use a transfer film. For example, JP-A 8-47551 discloses a production process which involves producing a transfer film having the following layer construction: plastic base film/release layer/surface protecting layer/metal thin-film layer/thermoplastic resin layer, bringing the thermoplastic resin layer side of the transfer film into contact with the surface of the golf ball and applying heat and pressure, then peeling off the plastic base film/release layer so as to transfer to the golf ball surface the thermoplastic resin layer/metal thin-film layer/surface protecting layer. However, a drawback of this method is that production of the transfer film involves a complicated set of operations. First, an intermediate film having the following layer construction is formed: release layer/surface protecting layer/water-soluble resin layer (formed in areas where the metal thin-film is not formed)/metal thin-film layer. Next, the water-soluble resin layer is removed by rinsing the intermediate film with water, thereby obtaining a metal thin-film layer having the intended lettering and images. The thermoplastic resin is then coated on top of the thin-film layer to complete production. This complexity results in a high cost per mark applied to the golf ball.

To simplify the production of transfer film obtained by such a complicated set of operations, JP-A 2000-1692 discloses a method of producing transfer film which involves forming a surface protecting layer and an ink layer on a plastic substrate, pressure bonding a metal thin-film over the entire surface thereon so as to form a metal thin-film layer which, when peeled off, will remain only over the ink layer due to the tackiness of the ink, then forming over the metal thin-film layer an adhesive layer. Unfortunately, in this method, depending on the stability of tack by the ink layer and the pressure bonding conditions, adhesion between the ink layer and the metal thin-film layer is sometimes greater than adhesion between the plastic substrate and the surface protecting layer or adhesion between the surface protecting layer and the ink layer. In such cases, peeling occurs at the plastic substrate and the surface protecting layer or at the surface protecting layer and the ink layer, making it impossible to efficiently obtain a transfer film bearing the intended lettering and graphics.

SUMMARY OF THE INVENTION

It is therefore an object of the invention to provide a method for preparing golf balls with indicia having metallic luster, which method can easily and efficiently form indicia having metallic luster on a golf ball surface. Another object of the invention is to provide golf balls with indicia having metallic luster which can be obtained by such a method.

To achieve the above objects, the present invention provides a method for preparing a golf ball with surface indicia such as a letter or image having metallic luster. The method includes the steps of forming an adhesive indicia made of a thermoplastic resin on a surface of a golf ball, bonding the metal thin-film on a metal thin film-bearing film over the indicia under pressure or heat and pressure, then peeling off the film so as to leave a portion of the metal thin-film having the same shape as the indicia adhering to and laminated with the indicia.

The invention also provides a golf ball bearing on a surface thereof an indicia having metallic luster which is prepared according to the foregoing method by forming an adhesive indicia made of a thermoplastic resin on a golf ball surface, then having a metal thin-film in the same shape as the indicia adhere to and laminate with the indicia.

The invention enables indicia having metallic luster to be easily and reliably formed on a golf ball surface without using a transfer film that is complicated and troublesome to produce.

BRIEF DESCRIPTION OF THE DIAGRAMS

DETAILED DESCRIPTION OF THE INVENTION

Figure 1:
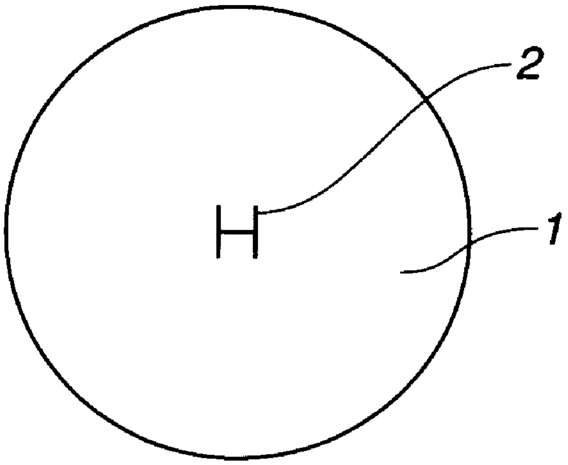
FIG. 1 is a top view of an example illustrating an adhesive indicia that has been formed on a golf ball surface.

The inventive method for preparing a golf ball with surface indicia having metallic luster is carried out by first forming, as shown in FIG. 1, an adhesive indicia 2 such as a letter or an image made of a thermoplastic resin on a surface 1 of the golf ball. A metal thin-film 22, described subsequently, is bonded to the adhesive indicia 2 under pressure or heat and pressure. The adhesive indicia 2 can be formed using one, or a combination of two or more, known thermoplastic resin materials, such as an ethylene-vinyl acetate copolymer (EVA), ethylene-acrylic acid copolymer (EAA), polyurethane, epoxy, polyolefin, polyester or polyamide. Moreover, if necessary, to impart tackiness to the adhesive indicia 2, a tacky substance such as an acrylic resin, vinyl acetate or synthetic rubber may also be included.

The adhesive indicia 2 has a thickness of preferably 1 to 10 μm, and most preferably 2 to 8 μm. An ink material to which the metal thin-film 22 is capable of adhering when bonded under pressure or heat and pressure can be used as the material for forming such an adhesive indicia 2. Commercial products, such as VIC inks manufactured by Seiko Advance, Ltd., may be used as the ink material.

Figure 2:
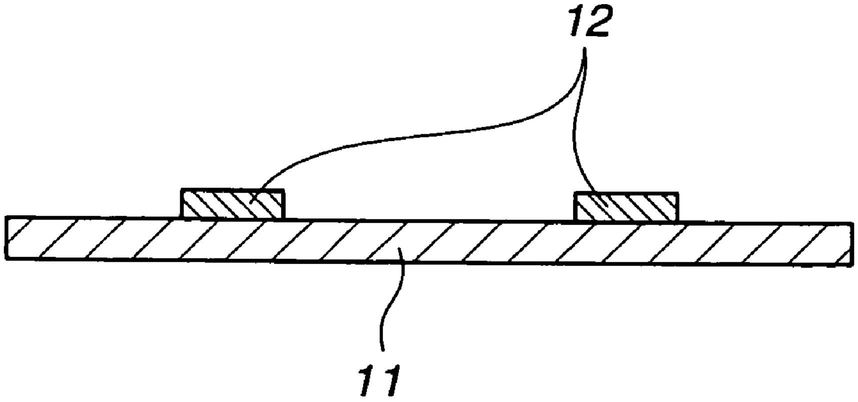
FIG. 2 is a cross-sectional view showing an example of a thermal transfer film for forming adhesive indicia.

Thermal transfer printing and pad printing are preferred as the method of forming an adhesive indicia 2 on the surface 1 of a golf ball. In thermal transfer printing, as shown in FIG. 2, use may be made of a method which involves using the above-described adhesive indicia-forming material to form in a peelable manner an indicia layer 12 containing the desired lettering and images by a suitable means such as silk screen printing on a plastic film 11 such as a biaxially oriented polypropylene film, thermally transferring the indicia layer 12 to the surface of the golf ball, then peeling the plastic film 11 from the adhesive indicia 2 that has been thermally transferred and formed on the golf ball surface. An illustrative, non-limiting example of a pad printing technique that may be employed involves making a plate having etched areas for printing the desired lettering and images, filling the etched areas with the adhesive indicia-forming material, and pad printing. Either approach may be used in the invention to form adhesive indicia 2 on the surface of the golf ball.

In the practice of the invention, to improve the tackiness of the adhesive indicia 2 to the golf ball surface 1, prior to forming the adhesive indicia 2, the surface of the golf ball where the indicia are to be formed may be administered physical or chemical surface treatment. Specific examples of such surface treatment include plasma treatment, corona discharge treatment, UV irradiation treatment, chlorine treatment, primer coating treatment, treatment that involves wiping the surface with an organic solvent, treatment involving the application of a silane coupling agent, honing treatment, and physical surface roughening treatment.

Next, the metal thin-film 22 on a metal thin film-bearing film is bonded over the resulting adhesive indicia 2 under applied pressure or applied heat and pressure, following which the film is peeled off so as to leave a portion of the metal thin-film 22 having the same shape as the indicia 2 adhering to and laminated with the indicia 2, thereby forming indicia having metallic luster on the golf ball surface.

Figure 3:
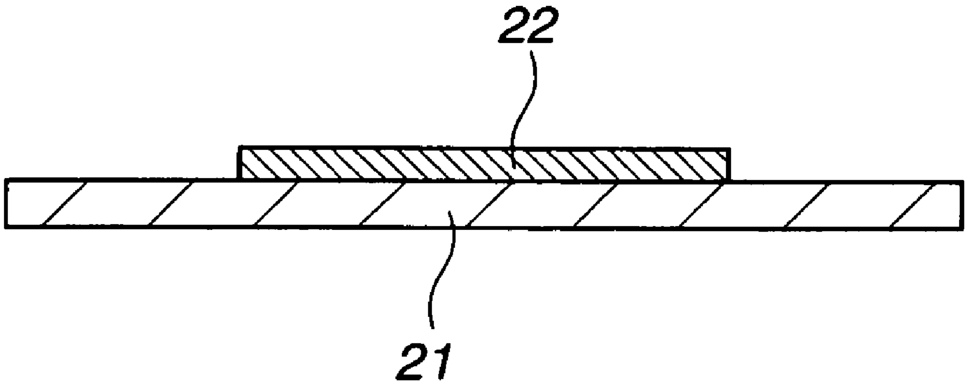
FIG. 3 is a cross-sectional view showing an example of a metal thin-film-bearing film.

The metal thin-film 22 bearing film used in the practice of the invention may be one which, as shown in FIG. 3, is obtained by the formation on a transfer substrate 21 of the metal thin-film 22 in a size which is capable of at least covering the adhesive indicia 2 and to a thickness of 0.03 to 0.05 μm. The method of forming a metal thin-film 22 on the transfer substrate 21 in this case is exemplified by known techniques such as vacuum vapor deposition, ion plating, sputtering and vapor-phase growth. Of these, vacuum vapor deposition is preferred from the standpoint of the size of the equipment required and the running costs. The type of metal used as the vaporization source is exemplified by aluminum, chromium, copper, cobalt, steel, silver, gold, nickel and various alloys thereof. Of these, the use of aluminum is preferred.

The transfer substrate 21 used in the invention is one having a melting point and hardness that enable it to withstand formation of the metal thin-film 22. For example, use may be made of a substrate which is a single-ply sheet of polypropylene, polyethylene terephthalate, polyethylene, polytetrafluoroethylene, silicone rubber, kraft paper, glassine paper or some other material, or which is a laminated sheet.

Figure 4:
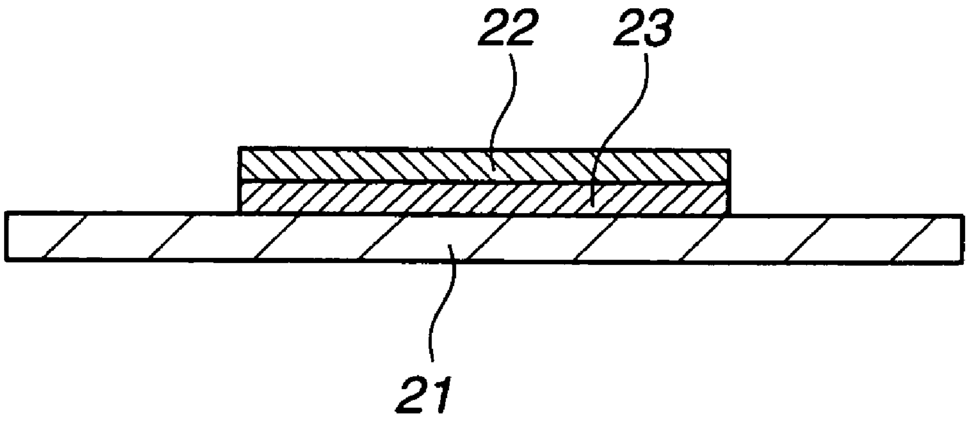
FIG. 4 is a cross-sectional view showing another example of a metal thin-film-bearing film.

Of these, a metallized film obtained by using vacuum vapor deposition to form a metal thin-film 22 on a plastic film is preferred. In this case, as shown in FIG. 4, formation of the metal thin-film 22 on the transfer substrate 21 can be carried out over an intervening color layer 23 made of a clear or translucent colored resin. The colored layer 23 is provided so as to be peelable from the substrate 21, and has a thickness of preferably 1 to 10 μm, and most preferably 2 to 8 μm.

No particular limitation is imposed on the method for bonding the film on which the above metal thin-film 22 has been formed to the adhesive indicia 2 under applied pressure or applied heat and pressure, provided the metal thin-film 22 adheres to and laminates with the adhesive indicia 2. However, bonding at 90 to 200° C., and especially 120 to 170° C., under an applied pressure is preferred. If the adhesive indicia 2 contains a tacky substance, bonding under pressure or under heat and pressure may be carried out at room temperature or a relatively low temperature.

Figure 5:
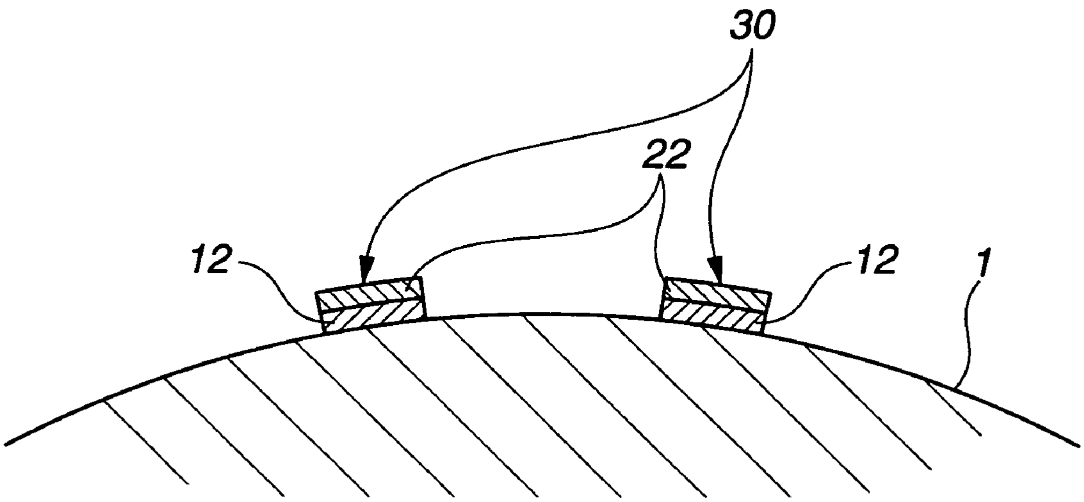
FIG. 5 is a partially simplified cross-sectional view showing an example in which indicia having metallic luster have been formed on a golf ball.
Figure 6:
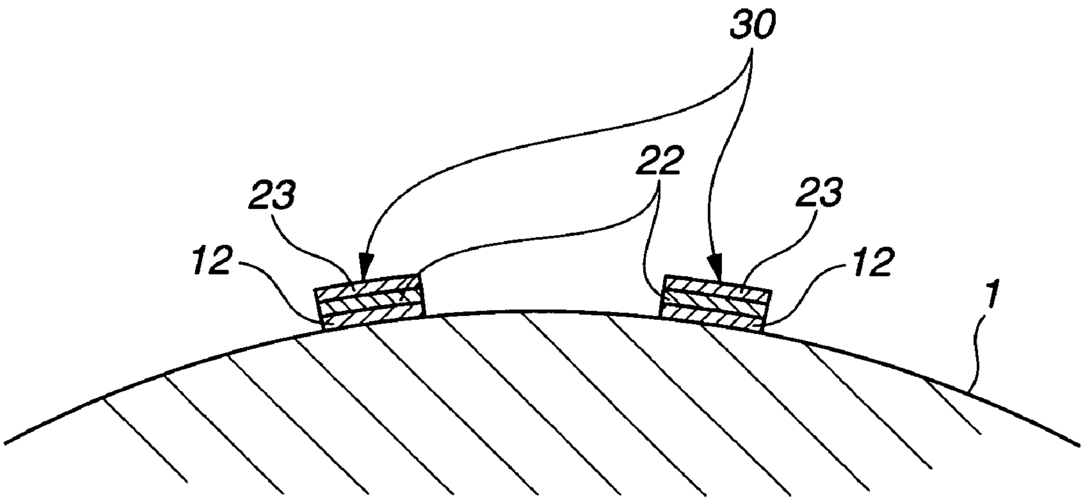
FIG. 6 is a partially simplified cross-sectional view showing another example in which indicia having metallic luster have been formed on a golf ball.

By thus bonding and laminating the metal thin-film 22 under applied pressure or applied heat and pressure to the adhesive indicia 2, then peeling and removing the film from the golf ball surface 1, as shown in FIG. 5, an adhesive indicia layer 12 is formed on the golf ball and a metal thin-film 22 of the same shape adheres to and laminates with the adhesive indicia layer 12, resulting in the formation of indicia 30 having a metallic luster due to the metallic color of the metal thin-film 22. If a film having the colored layer 23 shown in FIG. 4 is used, as shown in FIG. 6, a colored layer 23 forms on the metal thin-film 22, and the metallic color is tinted by the colored layer 23. For example, when the metal thin-film 22 is silver in color and the colored layer 23 is yellow, gold-colored indicia 30 are obtained.

In the practice of the invention, following the formation of indicia having such a metallic luster, a coat may be formed over the entire surface of the golf ball. Illustrative examples of coatings that may be used to form such a coat include two-part curable urethane coating (obtained by a crosslinking reaction between a polyol such as acrylic polyol, polyester polyol, polycarbonate polyol or polyurethane polyol and an isocyanate), aqueous emulsion coatings (e.g., polyester resin coatings, acrylic resin coatings, urethane resin coatings), and UV-curable acrylic or acrylic-urethane coatings. A two-part curable urethane coating is especially preferred. Because a polyurethane coat is flexible and has stretch, it can effectively prevent damage, such as from fissuring when the ball is hit, to letters and images containing the transferred metal thin-film.

No particular limitation is imposed on the construction, materials or method of manufacturing the golf ball prepared by the inventive method. That is, the ball can be molded by a conventional method using known materials. As for the ball construction, the ball may be a thread-wound golf ball or may be a solid golf ball having a one-piece construction, a two-piece construction, or a multi-piece construction that includes two or more cover layers.

EXAMPLES

The following Examples of the invention and Comparative Examples are provided by way of illustration and not by way of limitation.

Example 1

In a first stage of production, as shown in FIG. 2, the letter ‘H’ 12 (adhesive indicia layer) was silkscreen printed with VIC ink (710 Black, available from Seiko Advance, Ltd.) onto a 33 μm thick biaxially oriented polypropylene film 11 as the base film, thereby giving a transfer film A two-piece golf ball to which the mark is to be transferred was separately prepared. The ball had a crosslinked rubber core composed primarily of polybutadiene rubber and an approximately 2 mm thick cover composed primarily of an ionomer resin that encloses the core. The surface 1 of the ball was plasma treated.

Using the foregoing transfer film, the letter ‘H’ (adhesive indicia layer) was thermally transferred to the surface-treated golf ball surface 1, thereby forming an adhesive indicia 2, and the base film 11 was peeled off and removed. The transfer temperature was 140° C., and pressure was applied for 1 second with a silicone pad.

Next, in a second stage, as shown in FIG. 3, a metallized film was obtained by carrying out vacuum vapor deposition from an aluminum source onto a 33 μm thick biaxially oriented polypropylene base film 11 over an area large enough to cover the above-described letter 'H' so as to form an aluminum thin-film 22 having a thickness of 0.05 μm. The metallized film was placed on the golf ball bearing the above-described adhesive indicia 2 in such a way as to cover the letter 'H', and the aluminum thin-film layer 22 was heat and pressure bonded from the back side of the metallized film. The metallized film was then peeled from the golf ball so as to leave a portion of the aluminum thin-film 22 in the same shape as the letter 'H' adhering to and laminated with the adhesive indicia layer 12, thus forming indicia 30 having a metallic luster on the golf ball surface, as shown in FIG. 5. During heat and pressure bonding of the aluminum thin-film layer 22, the transfer temperature was 140° C. and pressure was applied for 1 second with a silicone pad.

Lastly, the entire golf ball was coated to a thickness of 17 μm with a two-part curable urethane coating.

Example 2

In the above-described second stage, as shown in FIG. 4, a colored layer 23 was formed by silkscreen printing a clear yellow VIC ink (208 Process Yellow; Seiko Advance, Inc.) onto a 33 μm thick biaxially oriented polypropylene film 21 as the base film over an area large enough to cover the above-described letter 'H'. Next, vacuum vapor deposition was carried out from an aluminum source onto the colored layer 23 over an area large enough to cover the surface printed with the clear yellow VIC ink so as to form an aluminum thin-film 22 having a thickness of 0.05 μm. Aside from using a metallized film like that shown in FIG. 4, exactly the same procedure was followed as in Example 1, thereby giving a golf ball like that shown in FIG. 6.

Example 3

In the above-described first stage, aside from preparing an engraved plate for printing the letter 'H' and using this to pad print the letter 'H' with VIC ink (710 Black; Seiko Advance, Inc.), a marked golf ball was prepared in the same way as in Example 1.

Comparative Example 1

The letter 'H' was silkscreen printed with a clear yellow VIC ink (208 Process Yellow; Seiko Advance, Ltd.) onto a 33 μm thick biaxially oriented polypropylene film as a first base film. Another 33 μm thick biaxially oriented polypropylene base film was prepared as a second base film, and vacuum vapor deposition was carried out from an aluminum source onto this film over an area large enough to cover the above-described letter 'H', thereby forming an aluminum thin-film 22 having a thickness of 0.05 μm. The second film was placed over the first film printed with clear yellow VIC ink, and heat and pressure bonded thereto, thereby transferring the aluminum thin-film layer. Next, the letter 'H' was silkscreen printed with a VIC ink (710 Black; Seiko Advance, Ltd.) onto the aluminum thin-film layer. The resulting transfer film, which had the following construction: base film/clear yellow VIC ink layer/aluminum thin-film layer/black VIC ink layer, was placed on a golf ball like that used in Example 1, and heat and pressure bonding was carried out with a silicone pad at 140° C. for 1 second from the back side of the transfer film, thereby transferring the black VIC ink layer/aluminum thin-film layer/clear yellow VIC ink layer to the golf ball surface.

Lastly, in a third stage of production, the entire golf ball was coated to a thickness of 17 μm with a two-part curable urethane coating in the same way as in Example 1, thereby giving a marked golf ball.

[Evaluation]

The marked balls were evaluated by the following methods.

Appearance

The marked areas were visually confirmed outdoors in sunlight.

Abrasion Tests

A 5-liter porcelain ball mill was charged with 1.7 liters of an alumina abrasive (Shorel Nugget 5S, made by Showa Denko KK), following which a golf ball was added and the mill was turned for two hours. The ball was then removed and peeling and damage to the indicia was visually rated (dry abrasion test). Also, a wet abrasion test was carried out after charging the mill with 1.7 liters of water in addition to the aluminum abrasive.

Durability to Impact

The marked golf balls obtained in each example were repeatedly shot 200 times against a fabric target with a W#1 club at a head speed of 45 m/s, and the degree of damage to the indicia was visually examined.

The results are shown in Table 1.

TABLE 1

| | Example 1 | Example 2 | Example 3 | Comparative Example 1 |
|---|---|---|---|---|
| Appearance | silver luster | silver luster | gold luster | gold luster |
| Ease of ball production | no particular problem | no particular problem | no particular problem | some defects in metallized areas |
| Abrasion test (dry) | good | good | good | good |
| Abrasion test (wet) | good | good | good | good |
| Impact durability test | good | good | partial peeling of protective film (revealing vapor-deposited Al layer) | partial peeling of protective film (revealing vapor-deposited Al layer) |

It is apparent from the results in Table 1 above that the inventive method is simple and effective (high production yield), produces golf balls having an excellent appearance, and provides indicia which have a good resistance to damage in wear tests and impact durability tests.

By contrast, in the golf ball marking method used in the comparative example, the steps involved in the production of the transfer film were complicated. In addition, because sufficient adhesion is difficult to achieve between the respective layers of the clear yellow VIC ink layer/plastic film (base) construction or the aluminum thin-film layer/clear yellow VIC ink construction, the indicia incurred damage in the transfer film production process.

The invention claimed is:

1. A method for preparing a golf ball with surface indicia having metallic luster, comprising:

forming an adhesive indicia made of a thermoplastic resin on a golf ball surface by thermal transfer printing, bonding a metal thin-film on a metal thin film-bearing film over the indicia under pressure or heat and pressure, and then peeling off the film so as to leave a portion of the metal thin-film having the same shape as the indicia adhering to and laminated with the indicia.

2. The method of claim 1, wherein the adhesive indicia contains a tacky substance.

3. The method of claim 1, wherein the metal thin film-bearing film is a metallized film obtained by vacuum vapor depositing a thin film of metal onto a plastic film.

4. The method of claim 3, wherein the metallized film is obtained by vacuum vapor depositing the thin film of metal onto the plastic film over an intervening colored layer made of a clear or translucent colored resin.

5. The method of claim 1, wherein a coat is formed on the golf ball surface so as to cover the indicia having metallic luster.

6. The method of claim 5, wherein the coat is formed with a two-part curable urethane coating.

7. The method of claim 1, wherein the adhesive indicia has a thickness of 1 to 10 μm.

8. The method of claim 1, wherein the metal thin-film has a thickness of 0.03 to 0.05 μm.

9. The method of claim 1, wherein the metal thin film-bearing film comprises a transfer substrate, and the metal thin-film is formed on the transfer substrate by intervening a color layer made of a clear or translucent colored resin between the metal thin-film and the transfer substrate.

10. The method of claim 9, wherein the color layer has a thickness of 1 to 10 μm.

11. The method of claim 1, wherein the metal thin-film on a metal thin film-bearing film is bonded to the adhesive indicia under heat and pressure at 90 to 200° C.

12. The method of claim 1, wherein the color of the adhesive indicia is black.

13. The method of claim 1, wherein the thermal transfer printing comprises:

using an adhesive indicia-forming material to form, in a peelable manner, an indicia layer containing the desired lettering and images by a silk screen printing on a plastic film, thermally transferring the indicia layer to the surface of the golf ball, then peeling the plastic film from the adhesive indicia that has been thermally transferred and formed on the golf ball surface.

14. The method of claim 1, wherein the surface of the golf ball having the indicia is administered a physical or chemical surface treatment prior to forming the adhesive indicia.

15. The method of claim 14, wherein the surface treatment is at least one kind selected from a group consisting of plasma treatment, corona discharge treatment, UV irradiation treatment, chlorine treatment, primer coating treatment, treatment that involves wiping the surface with an organic solvent, treatment involving the application of a silane coupling agent, honing treatment, and physical surface roughening treatment.

* * * * *